United States Patent [19]

Gourdon

[11] Patent Number: 5,188,568
[45] Date of Patent: Feb. 23, 1993

[54] SPEED VARIATOR PULLEY PROVIDED WITH A REDUCED FRICTION, REMOVABLE RINGS

[75] Inventor: Eric Gourdon, Treize Vents, France

[73] Assignee: Powerbloc IBC Canada Inc., Drumondville, Canada

[21] Appl. No.: 644,552

[22] Filed: Jan. 23, 1991

[30] Foreign Application Priority Data

Jan. 25, 1990 [FR] France .................. 90 01033

[51] Int. Cl.⁵ .......................................... F16H 59/00
[52] U.S. Cl. ............................... 474/13; 474/43
[58] Field of Search ........................ 474/43–46, 474/13–16

[56] References Cited

U.S. PATENT DOCUMENTS

| | | | |
|---|---|---|---|
| 3,088,327 | 5/1963 | Swigart | 474/13 |
| 3,659,470 | 5/1972 | Beaudoin | 474/13 |
| 3,680,403 | 8/1972 | Schupan | 474/13 |
| 3,808,900 | 5/1974 | Vadeboncoeur | 474/13 |
| 4,028,953 | 6/1977 | Lavallee | 474/13 |
| 4,102,214 | 7/1978 | Hoff | 474/13 |

FOREIGN PATENT DOCUMENTS

| | | | |
|---|---|---|---|
| 1127166 | 4/1962 | Fed. Rep. of Germany | 474/43 |
| 2594516 | 9/1987 | France | 474/13 |
| 149652 | 9/1982 | Japan | 474/43 |
| 149450 | 9/1983 | Japan | 474/13 |
| 983359 | 2/1965 | United Kingdom | 474/43 |

*Primary Examiner*—Renee S. Luebke
*Assistant Examiner*—F. Saether
*Attorney, Agent, or Firm*—Foley & Lardner

[57] ABSTRACT

A speed variator pulley provided with reduced flexion removable rings is used in a variable speed transmission of the V pulley type, provided with a trapezoidal belt. Transmissions of this type are, for example, used in snow scooters, motorcycles, utilitarian or pleasure vehicles or cars without permit or of the TQM type. The pulley of the invention has an arrangement which makes it possible to reduce the axial friction forces which are the cause of a hysteresis effect in the operation of the pulley.

8 Claims, 3 Drawing Sheets

SPEED VARIATOR PULLEY PROVIDED WITH A REDUCED FRICTION, REMOVABLE RINGS

BACKGROUND OF THE INVENTION

The present invention relates to a speed variator pulley provided with removable rings having a reduced friction and used, namely, in a variable speed transmission of the "V" belt type pulleys and trapezoidal belt. Transmissions of this type are, for example, used in snow scooters, motorcycles, utilitarian or pleasure vehicles or cars without permit or of the TQM type.

They generally comprise a driven pulley solid with a drive shaft and a driving pulley drawn into rotation by a belt lying in the grooves of the two pulleys. The driving pulley is adapted so the winding diameter of the belt that is automatically adjusted as a function of the speed of rotation of the pulley. The belt having a set length, the driving pulley has a winding diameter which varies inversely of the driving pulley. Under the combined effect of these two variations, the ratio of the speeds of rotation of the two pulleys is modified according to the changes in diameter of the driving pulley.

As examples of driving pulleys of the type mentioned previously as described in FR-A-2,504,635 and CA-A-1,212,559.

They generally comprise two coaxial cheeks having frustoconical sidewalls facing one another and forming between them a V-shaped groove. A cheek, called the fixed or fast cheek, is secured in rotation and in translation on the drive shaft of the pulley and the other, called the movable cheek, may slide axially on the shaft. Behind the movable cheek, there is provided an oblique ramp of which the surface turned toward the axis of the shaft faces a second oblique ramp of a reaction cup solid with the drive shaft of the pulley. Inertia weights provided in housings of the movable cheek and in housings of a reaction cup are capable of radial displacement and are guided, in this movement, by the lateral walls of these housings.

When the shaft of the pulley rotates, it drives the fixed cheek and the reaction cup into rotation. The latter transmits its rotation motion, through the lateral walls of the housings of the reaction cup, to the inertia weights which in turn drive the movable cheek through the lateral walls of the housings of said movable cheek, On the other hand, because they rotate, the inertia weights are subjected to the action of centrifugal forces and, moving radially, respectively bear against the two ramps of the movable cheek and those of the reaction. Because of their trapezoidal shape, they exert an axial push on the movable cheek which then slides toward the fixed cheek. For a given rotation speed of the pulley, an equilibrium is reached when this axial push is counterbalanced by an axial return force exerted by return springs mounted between the movable cheek and a shoulder of the shaft of the pulley.

According to this equilibrium, the winding diameter of the belt of trapezoidal cross section takes on a value which varies depending on the speed of rotation of the pulley.

In dynamics, when the speed of rotation increases, the centrifugal forces on the inertia weights increase proportionally. The axial force of the latter on the ramps increases equally and the equilibrium is displaced toward close-up of the two cheeks. Therefore, the winding diameter of the belt increases. Inversely, when the speed decreases, the axial thrust of the inertia weights decreases, and the equilibrium is displaced toward distancing of the two cheeks. The winding diameter of the belt thereby decreases.

In fact, axial forces generated on various points of the pulley oppose the axial movement of the cheek movable on the drive shaft. They usually originate from frictional forces with may be generated, for instance, by contact of the inertia weights with the ramps, by contact of the movable cheek with the drive shaft, etc. These axial forces generate a hysteresis effect in the operation of the pulley. Indeed, when the speed increases, the movable cheek is displaced toward the fixed cheek. The axial reaction forces oppose this motion of the movable cheek and avoid the axial thrust exerted by the inertia weights. The equilibrium is thus displaced toward a lesser closing in of the two cheeks and the winding diameter is consequently smaller than what it should be without these frictions forces. On the other hand, when the speed of rotation decreases, the movable cheek moves away from the fixed cheek. The axial friction forces which oppose this motion thereby tend, in this case, to hold the two cheeks close to one another. The winding diameter is thereby greater than what it should be without these friction forces.

Among the axial forces which originate from the friction forces, those that are generated by the contact of the movable cheek with the drive shaft are of interest here. They have values proportional to the radial forces applied on the guide shaft by the movable cheek. Now, these radial forces originate from the reactions generated by the belt on the movable cheek. Under the influence of these forces of which the radial resultant is not zero, the movable cheek has a tendency, when rotating, to tilt with respect to an axis normal to the axis of the pulley. These reactions forces in fact form a torque which is compensated by the one which is formed, with respect to the same normal axis, by the reaction of the movable cheek on the drive shaft at their points of contact located symmetrically on either side of the said normal axis.

In order to lessen the hysteresis effect in the operation of the pulley, it is necessary to provide means which allow to reduce the axial friction forces developing between the movable cheek and the drive shaft.

It will be noted here that the transmission of which the driving pulley has too large a hysteresis effect reduces the performances of vehicles having such a transmission.

Three essential problems are to be solved to reduce in an efficient manner the friction forces between the movable cheek and the drive shaft. The first one lies in providing slide bearings for the movable cheek which have to be of the type having a small coefficient of friction but which also have to be easy to install and to replace, which is not generally the case since such bearings are force fitted and necessitate tooling for their mounting and removal.

The second one lies in providing an arrangement allowing to increase the distance between the two terminal bearing points of the movable cheek on the drive shaft but which also allows the mounting of a disconnection ring on the said shaft at the bottom of the groove of the pulley; the mounting of this ring generally necessitating that this length be reduced.

The third problem is to provide an arrangement which is appropriate for solving the previous problems and which further allows to shorten the distance comprised between the point of contact of the belt with the movable cheek and the pivot axis of the movable cheek. By decreasing this length, the reaction torque of the cheek on the shaft is decreased and, consequently, the axial and radial forces generated by this torque.

SUMMARY OF THE INVENTION

The purpose of the present invention is therefore to propose means and an arrangement of such means which allow to avoid the drawbacks mentioned above and to solve the problems to which they give rise.

To this effect, the present invention is concerned with a driving pulley of a variable speed transmission of which a driven pulley is actuated by a belt of trapezoidal cross section connecting it to the said driving pulley, the latter comprising two coaxial, cheeks with frustoconical sidewalls facing one another to define between them a V groove in which the trapezoidal belt is made to lie. One of the cheeks, called the fixed cheek is secured on one end of a hub solid with a drive shaft. The other cheek, called the movable cheek, is capable of axially sliding on the hub disconnection ring, and is provided for freely rotating around the hub at the bottom of the groove of the pulley, said disconnection ring being provided with a groove having a profile complementary to that of the inner periphery of the belt.

According to one feature of the invention, the movable cheek is adapted for sliding on the hub through the intermediary of a first slide ring made solid with the movable cheek, and of a second slide ring made solid with the hub, the second slide ring solid with the hub bearing on one side of the disconnection ring, each of the two slide rings comprising, facing one another, a circular groove having a bottom of which bears a helicoidal spring axially mounted around the hub, the movable cheek being bored with an axial hole wide enough to let pass the disconnection ring when the movable cheek slides toward the fixed cheek.

According to another feature of the invention, the second slide ring is made solid with the hub only by being thrusted by the axial force that the spring exerts upon it against the surface of translation abutment means solid with the hub; and the first slide ring is made solid with the movable cheek only by being thrusted by the axial force that the spring exerts upon it against the surface of a translation abutment means solid with the movable cheek.

According to another feature of the invention, the slide rings are made of a material having a small coefficient of static and dynamic friction.

According to another feature of the invention, the first slide ring is formed with a groove into which is mounted a first collar having a small coefficient of static and dynamic friction.

According to another feature of the invention, the first collar is constituted by a guiding segment formed, on its circumference, with a notch and is made of a material of the PTFE type (polytetrafluoroethylen) loaded or not.

According to another feature of the invention, the second slide ring is formed, on its outer surface, with a groove into which is mounted a second collar having a small coefficient of static and dynamic friction.

According to another feature of the invention, the second collar is a guiding segment provided, on its circumference, with a notch and is made of a material of the PTFE type (polytetrafluoroethylen) loaded or not.

According to another feature of the invention, the collars are made up of strips wound, respectively, in the grooves of the rings, the strips being made of a material of the PTFE type (polytetrafluoroethylen) loaded or not.

BRIEF DESCRIPTION OF THE DRAWINGS

The features of the invention mentioned above, as well as others, will appear more clearly from reading of the description that follows of one embodiment, the said description having reference to the appended drawings wherein.

DESCRIPTION OF A PREFERRED EMBODIMENT

The description that follows is that of a driving pulley of a transmission for automatic speed changes. While producing, with this type of pulley, a well adapted technical result, the invention applies as well to other pulleys which comprise a fast flask and a movable flask capable of sliding over an axis or over a hub solid with this axis.

Figure 1:
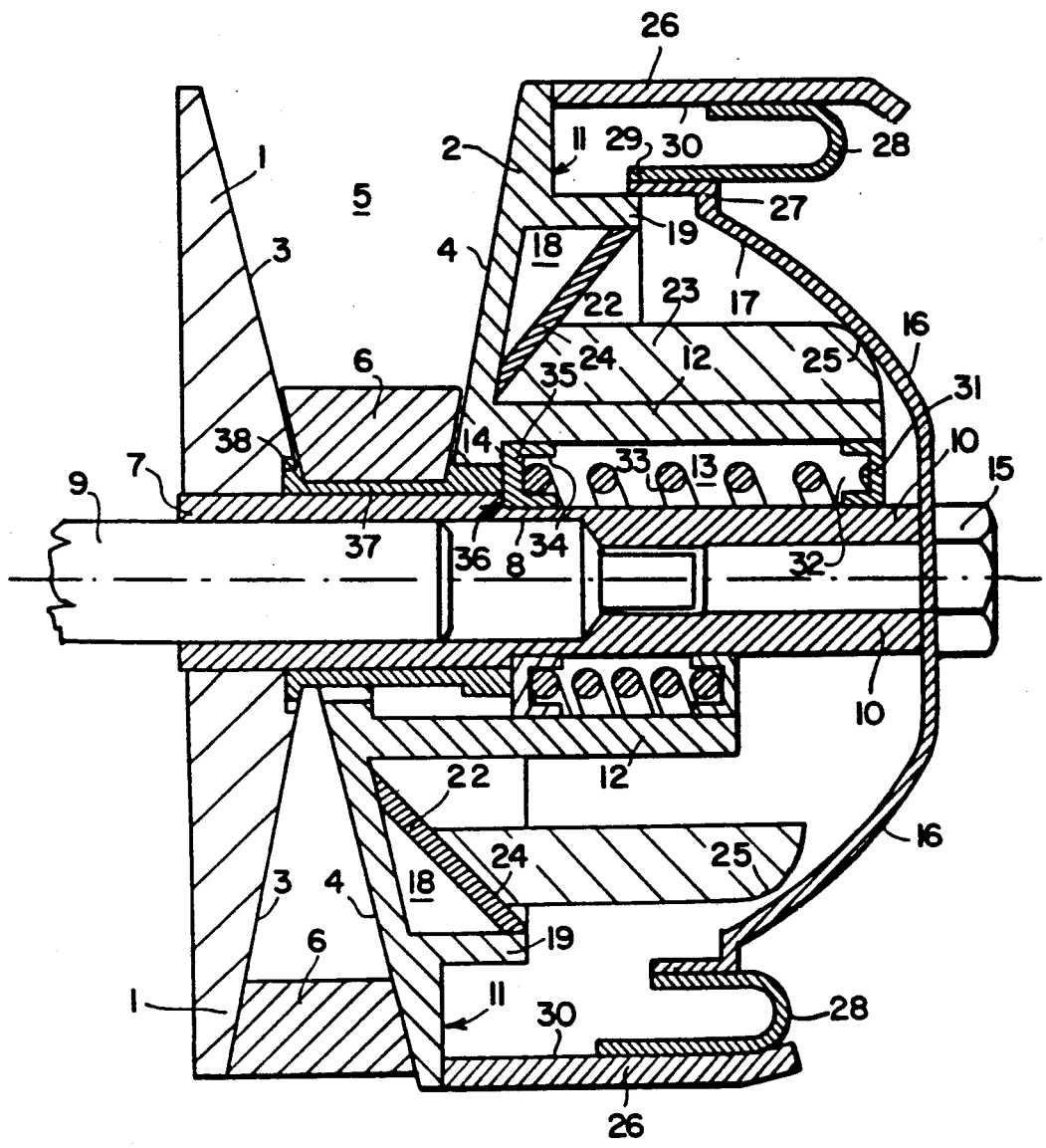
FIG. 1 is a cross-sectional view of a driving pulley of a variable speed transmission according to the invention, the upper part of the view illustrating a first state of equilibrium in which the pulley is said to be "in disconnected position" and the lower part of a second state of equilibrium in which the pulley has the belt at its maximum winding diameter.
Figure 2:
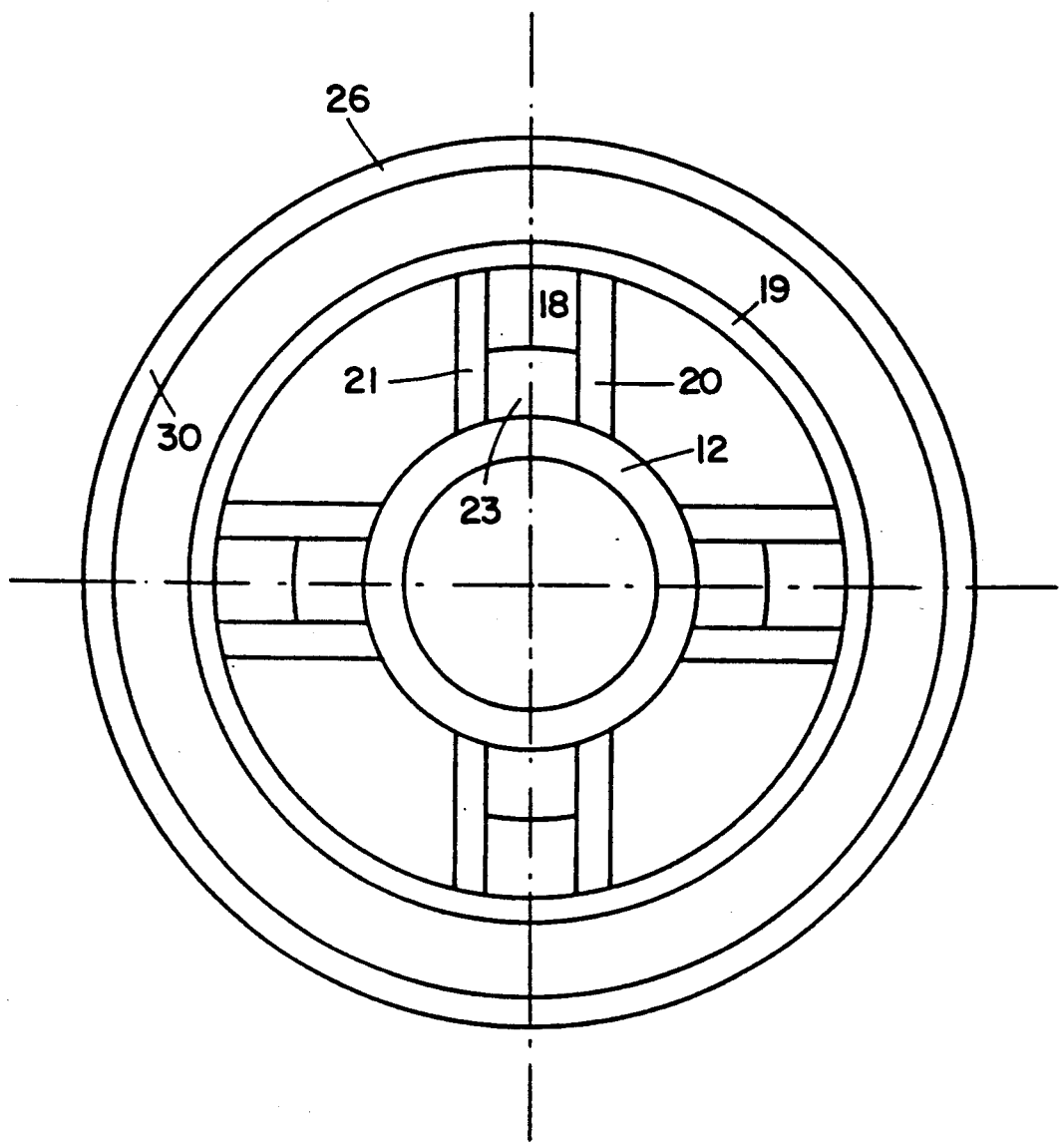
FIG. 2 is an axial back view of a movable cheek of a pulley according to the invention.

The description of the constituent elements of a driving pulley according to the invention is made in connection with FIGS. 1 and 2.

A driving pulley of a transmission for automatic speed variation, according to the invention, comprises two coaxial cheeks 1, 2 of which the frustoconical sidewalls face one another to define a V groove between them. A belt 6 of trapezoidal cross section is made to lie in the groove to transfer the torque to a driven pulley (not shown). The cheek 1 is coaxially secured to the end of the hub 7 having an axial bore 8 in which, is force fitted the end of the drive shaft 9. Not shown are means, such as a key or the conical end of the shaft 9, which may be provided to increase the rotational grip of the hub 7 over the drive shaft 9.

The hub is divided into two cylindrical parts 7, 10 of which the part 7, located on the side of the drive shaft 9, has a diameter larger than that of part 10.

Starting from its face 11 opposite that of its trapezoidal sidewall 4, the cheek 2 is axially extended by an annular body 12 defining a blind hole 13 of which the bottom wall 14 extends the frustoconical sidewall 4.

At the end of the hub 7 which is opposite that receiving the cheek 1 and the drive shaft 9, is secured a reaction cup 16 by means of a screw 15. Not shown are means which may be provided to improve the rotational grip of the reaction cup 16 over the hub 7, such as pegs, grooves, flats, etc. The reaction cup 16 is constituted by a disk of which the peripheral portion is bent toward the axis along an appropriate curvature. The inner surface of the reaction cup 16 defines a concave ramp 17 turned toward the axis.

Housings 18 are provided at the back of the cheek 2. They are uniformly distributed around the annular body 12 and are, for example, four in number. They are radially defined, on the one hand, by the annular body 12 and by an annular concentric wall 19 having a diameter greater than that of the annular body 12 and, on the other hand, laterally by sidewalls 20, 21 grouped in pairs. The sidewalls 20, 21 of each pair are parallel and are equally spaced on either side of a common radial plane. Fixed within each of the housings 18, obliquely with respect to the axis of the pulley, is a linear ramp 22 of which the surface turned toward the axis is also turned outwardly of the cheek 2. Each of the housings 18 receives an inertia weight 23 of which the length is equal, given the clearance, to the distance that separates the sidewalls 20, 21 of each pair. In the lengthwise direction, each inertia weight 23 shows an elongated shape having, at one end, an oblique edge 24 of the same obliquity than that of the ramp 22 with respect to the pulley axis and, at the other end, a rounded edge 25. Each inertia weight 23 is thus adapted for sliding radially in the corresponding housings 18 of the cheek 2 and is guided by the sidewalls 20, 21. It is also adapted for being driven into rotation by the cheek 2 by means of the same sidewalls 20, 21. The rounded shape of the edge 25 is such that each inertia weight is in contact with the ramp 17 of the reaction cup 16 on only a single point.

At the periphery of the cheek 2 and on the side opposite its frustoconical sidewall 4 is secured an annular body 26 of which length is essentially equal to that of the annular body 12. The reaction cup 16 has, at its periphery, an annular portion extending the cup 16 in the direction of the movable cheek 2. A membrane 28, secured by one of its faces against the inner surface 30 of the annular body 26, starts from this wall in a direction away from the cheek 2, and against the outer surface of the annular part 27 of the reaction cup 16 where is secured to a face 29 of part 27. The membrane 28 has a section along a full radial plane having an inverted C shape. Each wing of this C may slide axially with respect to the other wing with a minimum of effort corresponding to the bending resistance of the material of the membrane. On the other hand, the bent zone of the membrane offers an important resistance to sliding in rotation one with respect to the other.

In order to have these mechanical features, the membrane is made of a rubber which for instance may be EPDM (ethylen-propylen) or silicone, etc.

At the end of the annular body 12 where the blind hole 13 opens and on its inner surface, is mounted a slide ring 31 of which the face inward the blind hole 13 is formed with an annular groove 32. The inner diameter of the ring 31 is equal, given the clearance, to the outer diameter of the cylindrical part of the hub. It may then slide thereon.

A helicoidal return spring 33 is axially mounted around the part 10 of the hub 7 and bears by one of its ends, on the bottom wall of the annular groove 32 of the ring 31. Its other end bears against the bottom wall of an annular groove 34 formed on the face of a second slide ring 35 which is turned inwardly of the blind hole 13. The ring 35 is thrusted by the return spring 33 against a translation butt means, such as a shoulder 36 formed at the intersection of the two cylindrical parts 7, 10 of the hub.

By its inner surface, the ring 35 is solid with the cylindrical part 10 of the hub and is adapted for sliding, by its outer surface, on the inner surface of the blind hole 13 of the annular body 12.

A disconnection ring 37 is mounted freely in rotation at the bottom of the pulley groove 5 on the cylindrical part 7 of the hub having the largest diameter. It is made of a material having a small coefficient of friction and formed, on its outer surface, with a groove of which the profile is complementary to that of the inner periphery of the belt 6. It is limited, in translation over the hub 7, on one side by the bottom surface of a rabbet 38 defined on the fixed cheek 1 coaxially of the hub 7 and, on the other hand, by the ring 35.

It will be noted that the wall 14 in of the bottom of the blind hole 13 is pierced with an axial hole to allow for the passage of the ring 37 so that the latter may come to butt against the ring 35. When the belt 6 no longer rests on the disconnection ring 37 (it is for instance in the position shown in the lower part of FIG. 1), the wall 14 of the movable cheek 2 is radially above the groove of the disconnection ring.

In the disconnected position, that is when it rests upon the disconnection ring 37 (upper part of FIG. 1) the sidewalls of the belt are slightly spaced from the sidewalls 3, 4 of the cheeks 1, 2.

Figure 3:
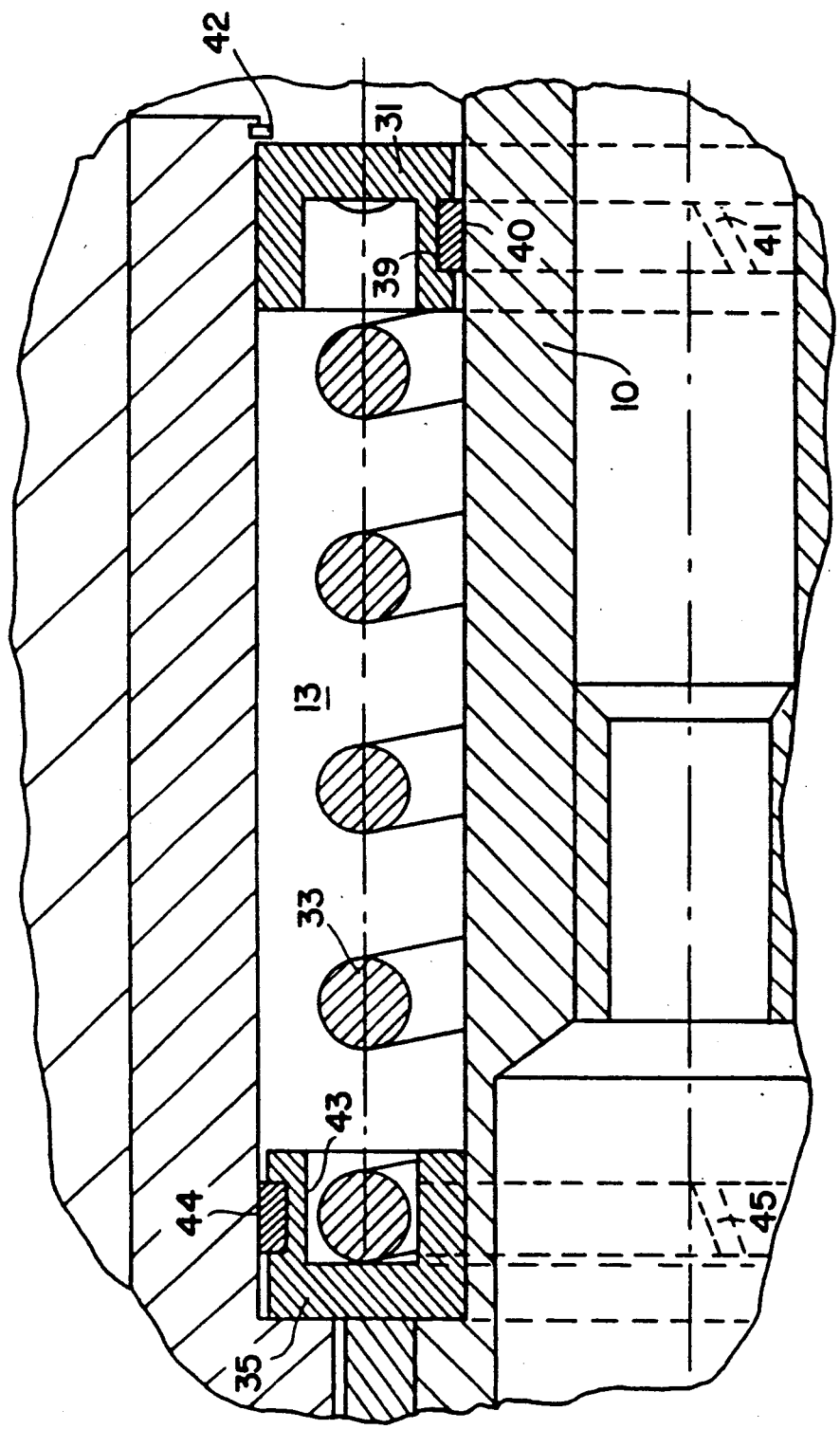
FIG. 3 is a view of a mounting detail of the movable cheek on the hub of a pulley according to the invention.

In FIG. 1, the rings 31, 35 are, for instance, self-lubricating. They are made of a material having a small coefficient of friction, static as well as dynamic. Thus, the frictional forces created between the ring 31 and the part 10 of the hub 7 and those generated between the ring 35 and the inner surface of the blind bore 13 have minimized values. FIG. 3 shows in detail how it is possible still to reduce these friction forces. Ring 31 has an inner diameter which is greater than the outer diameter of the part 10 of the hub 7. Its inner surface is formed with a groove 39 in which is mounted a collar 40 which may, for instance, be a guiding segment provided on its circumference with a notch 41. It is made of a material having a small coefficient of static and dynamic friction, such as for example, PTFE (polytetrafluoroethylen) loaded or not. The inner diameter of the segment 40 is set over the outer diameter of the hub 7. The ring 31 is mounted, with clearance, in the blind bore 13 and is thrusted by a spring 33 against a translation abutment means 42.

The ring 35 has an outer diameter which is smaller than the inner diameter of the blind bore 13 of the annular body 12. Its outer surface is formed with a groove 43 in which is housed a guide collar 44 which may, for instance, be a segment having, like segment 40, a notch 45. It is likewise made of a material having a small coefficient of static and dynamic friction which may, for instance, be PTFE (polytetrafluoroethylen) loaded or not. The outer diameter of the segment 44 is set on the inner diameter of the blind bore 13. The ring 35 is mounted, with clearance, on the part 10 of the hub 7.

Each of the collars 40, 44 may likewise be made from bends or strips of PTFE which are respectively wound in each of the grooves 39 and 43.

The operation of the illustrated pulley is as follows. The hub 7, being solid with the drive shaft 9, it rotates at its speed. During its rotation, it drives the cheek 1 and the reaction cup 16. By the presence of the membrane 28, the reaction cup 16 drives the cheek 2 which then rotates at the speed of the assembly and, in particular, of the fixed cheek 1. With the cheek 2 rotating, the sidewalls 20, 21 of the housings 18 carry the inertia weights 23 into rotation.

At a given speed of rotation of the drive shaft and the inertia weights 23 are subjected to centrifugal forces which force them to move radially against the ramps 17, 22. Due to the obliquity of the edge 24 of each of the inertia weights 23, the rounded shape of the opposite edge 25, the inclination of the ramp 22 and the shape of the ramp 17 of the reaction cup 16, these centrifugal forces have axial components which act on each of the ramps 17, 22. Since reaction cup 16 is axially stationary with respect to the hub 7, these components come down to an axial thrust on the ramp 22 and therefore on the cheek 2. Accordingly, the cheek 2 being free to slide over the hub 7 and, in particular, by way of the surface 10 of the blind hole 13, over the slide ring 35, and by way of the slide ring 31, over part 10 of the hub 7, the said cheek 2 moves axially toward the fixed cheek 1, which drives the compression spring 33 which then opposes a return force essentially proportional to its elongation.

It will be noted that this return force biases the rings 31 and 35 which are thus more heavily thrusted against the means 42, for one, and against the shoulder 36 for the other. The means 42 which may for instance be a circlip, further transmits the force exerted by the spring 33 to the movable cheek 2.

At a certain speed of rotation, this return force has the same amplitude but is in a direction reversed to that of the axial thrust exerted by the weights 23. These two forces therefore cancel one another and a static equilibrium between the two cheeks 1, 2 is reached. The trapezoidal belt 6 engaged in the groove 5 defined by the two cheeks 1, 2 sees its winding diameter taking a value which is more or less important, depending on this state of equilibrium.

FIG. 1 illustrates, by half, the two extreme states of equilibrium that the pulley of the present invention may reach.

In dynamics, when the speed of rotation increases, the centrifugal forces on the inertia weights 23 increase proportionally. The axial thrust of the latter on the ramps 17, 22 likewise increases and the equilibrium is moved toward closing in of the two cheeks 1, 2.

It follows that the winding diameter of the belt 6 increases. Inversely, when the speed decreases, the axial thrust of the inertia weights 23 weakens and the equilibrium is moved toward spreading apart of the two cheeks 1, 2. It follows that the winding diameter of the belt 6 decreases.

In fact, the contact of each of the weights 23 with the corresponding ramps 17, 22 generates frictional forces which oppose radial shifting of the weights 23 and axial displacement of the movable cheek 2. Likewise, the latter slides on the hub 7 while creating friction forces that oppose its own axial displacement. The membrane 28 also resists the axial shifting of the movable cheek 2.

These axial forces generate a hysteresis effect during the operation of the pulley. Indeed, as the speed increases, the cheek 2 moves towards the cheek 1. The axial reaction forces counteract this movement and go against the axial thrust exerted by the weights 23. The equilibrium is thus moved toward a lesser closeness between the two cheeks 1, 2 and the winding diameter of the belt is then smaller than what it should be where it not for these friction forces. On the other hand, when the speed of rotation decreases, the movable cheek 2 moves away from the stationary cheek 1. The frictional forces that counteract this movement then tend, in this case, to keep the two cheeks 1, 2 close to one another. It follows that the winding diameter is greater than what it should be where it not for these friction forces.

The greater the axial reaction forces, the more important is the hysteresis effect. Now, in the pulley according to the invention, these axial forces are minimized. Indeed, the contact of the inertia weights 23 with the reaction cup 16 is punctual. It follows that the friction forces are small. The membrane 29 exerts a small axial reaction in order to bend itself.

Moreover, with the arrangement of the invention, the three problems raised above have been solved. Rings have been mounted which have a small coefficient of static and dynamic friction without hindering the easy with which they can be mounted and removed. This is particularly true if rings are used having collars, as is illustrated in FIG. 3. Indeed, collars 40, 44 are selected that have a small coefficient of static and dynamic friction. On the other hand, if they are formed of segments, by means of the notches 41, 45 of which they are provided and by which they can be stretched or contracted, they can easily be mounted and removed. If they are made of wound strips, their mounting is obviously easy. Furthermore, rings 31 and 35 are, respectively simply slid in the blind hole 13 and on the hub 7. They are thus easily mounted and removed without any special tools being required.

The forces generated by the belt on the movable cheek 2 have radial components that create a torque which tends to place the movable cheek slantwise by causing it to rotate about an axis perpendicular to the main axis of the pulley. This axis is essentially parallel to another axis which joins the two pulleys of the transmission and it passes essentially through the point of contact between the movable cheek 2 and the hub 7, which is closes to the sidewall 4, that is in the case of the pulley shown in FIG. 1, the point of contact between the ring 35 and the inner surface of the bind hole 13. This torque is compensated by the one which is generated by the reaction forces of the cheeks 2 on the hub 7 of which the points of application are located respectively on the inner diameter of the ring 31 or on the outer diameter of the ring 35. The first torque being small, since the distance between the point of application on the movable cheek of the radial forces generated by the belt and the pivot axis of the cheek is reduced, the second torque and, consequently, the reaction forces of the hub 7 of, the ring 31 and those on the ring 35 of the cheek 2, are weak. All the weaker since the distance which separates the two rings 31, 35 is long. This distance, in the pulley combination of the invention, is as will easily be understood, the longest possible, considering the fact that the movable cheek must be radially above the groove of the disconnection ring 37. It will be noted that in order to do so, the distance between the rings 31, 35 varies as a function of the position of the movable cheek on the hub (upper and lower parts of FIG. 1).

The reaction forces of the hub 7 on the ring 31 and those of the ring 35 on the movable cheek 2 being weak, as has just been shown, the axial friction forces generated by the movement of the movable cheek 2 are likewise weak. Consequently, as the latter are determinant as to the amplitude of the hysteresis effect in the operation of the pulley, this effect is considerably less pronounced than those present in the prior art pulleys.

What is claimed:

1. A variable speed transmission pulley comprising:
   two coaxial cheeks having frustoconical sidewalls facing one another to define between them a V groove in which a belt of trapezoidal cross section is disposed, one of the cheeks being a fixed cheek secured on one end of a hub which is integral with a shaft, and the other cheek being a movable cheek capable of axially sliding on the hub; and a disconnection ring provided for freely rotating around the hub at the bottom of the groove of the pulley, the disconnection ring being formed with a groove having a profile complementary to that of the inner periphery of the belt, wherein the movable cheek is slidably mounted on the hub via a first slide ring fixed from movement with respect to the movable cheek and a second slide ring fixed from movement with respect to the hub, the second slide ring bearing on one side of the disconnection ring, each of the first and second slide rings supporting the movable cheek on the hub and comprising a circular groove which faces the other of the first and second slide rings and which has a bottom on which bears a helicoidal spring axially mounted around the hub wherein said first and second slide rings are separate members not rigidly attached to any contacting surfaces, the movable cheek being bored with an axial hole which slidably receives the disconnection ring when the movable cheek slides toward the fixed cheek.

2. The improved pulley of claim 1, wherein the second slide ring is fixed from movement from the hub only by an axial force that the spring exerts upon it against the surface of a translation abutment integral with the hub, and the first slide ring is fixed from movement from the movable cheek only by an axial force that the spring exerts upon it against the surface of a translation abutment integral with the movable cheek.

3. The improved pulley of claim 2, wherein the first and second slide rings are made of a material having a small coefficient of static and dynamic friction.

4. The improved pulley of claim 3, wherein the first slide ring has an inner surface formed with a groove into which is mounted a first collar having a small coefficient of static and dynamic friction.

5. The improved pulley of claim 4, wherein the first collar is a guiding segment having a circumference provided with a notch, and is made of a material of the PTFE type (polytetrafluoroethylen).

6. The improved pulley of claim 5, wherein the second slide ring has an outer surface formed with a groove into which is mounted a second collar having a small coefficient of static and dynamic friction.

7. The improved pulley of claim 6, wherein the second collar is a guiding segment having a circumference provided with a notch, and is made of a material of the PTFE type (polytetrafluoroethylen).

8. The improved pulley of claim 7, wherein the first and second collars are made up of strips wound, respectively, in the grooves of the first and second slide rings, the strips being made of a material of the PTFE type (polytetrafluoroethylen).

* * * * *